United States Patent
Atienza et al.

(10) Patent No.: US 8,014,975 B2
(45) Date of Patent: Sep. 6, 2011

(54) FTIR AND EDX SPECTRUM LIBRARY OF CONTAMINANTS FOUND ON A HDD AND THEIR POTENTIAL SOURCES

(75) Inventors: Genevieve R. Atienza, Laguna (PH); Michele Cabalo, Laguna (PH); Sharon Capuyan-Agtina, Laguna (PH); May A. De Guzman-Aguirre, Taguig (PH); Sharon Del Rosario, Las Pinas (PH); Jamie Velacion, Cavite (PH)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 510 days.

(21) Appl. No.: 11/904,640

(22) Filed: Sep. 28, 2007

(65) Prior Publication Data

US 2009/0089012 A1  Apr. 2, 2009

(51) Int. Cl.
*G06F 11/32* (2006.01)
(52) U.S. Cl. .................................................. 702/185
(58) Field of Classification Search ............ 702/185
See application file for complete search history.

(56) References Cited

U.S. PATENT DOCUMENTS

| 6,975,944 | B1* | 12/2005 | Zenhausern | 702/22 |
| 2003/0233864 | A1* | 12/2003 | Rodier | 73/24.06 |
| 2008/0009140 | A1* | 1/2008 | Williamson et al. | 438/706 |

OTHER PUBLICATIONS

Bruce Allen, Monitoring Hard Disks with SMART, issue 117, Jan 1, 2004, p. 1-8.*
Shuyu Zhang, IEEE, Numerical and Experimental Study of the Particle Contamination in a Head/Media Interface, page Sep. 1999, p. 2442-2444.*
Motion Control Technology, Motion Controller Helps Test for Hard Disk Defects, p. 1-3, 2006.*

* cited by examiner

Primary Examiner — Tung S Lau

(57) ABSTRACT

A data collection for utilization in failure analysis. The data collection includes a material data set including information associated with materials used in a component subject to a failure analysis process. The data collection also includes a source data set including information associated with the sources of the materials. The data collection further includes an image data set including graphical representations of the materials. The data collection is for providing identification of the composition of the contaminant and source of the contaminant.

18 Claims, 9 Drawing Sheets

FTIR AND EDX SPECTRUM LIBRARY OF CONTAMINANTS FOUND ON A HDD AND THEIR POTENTIAL SOURCES

TECHNICAL FIELD

The invention relates to the field of failure analysis of hard disk drives.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

There are known instances when a disk drive will cease to function properly, commonly referred to as disk failure. A process commonly termed failure analysis may be used to determine possible causes of the failure. Failure analysis, and subsequent causal determinations, can initiate remedies for increased product reliability. By virtue of the vast numbers of various types, and the fabrication processes and compositions associated therewith, of devices, controllers, connectors and other components present in a hard disk drive, failure analysis time can be expensive.

Examples of failure can include, but is by no means limited to, operational failure, assembly failure, fabrication failure, and so on. When one component/process fails, it may be due to a failure of that component/process or failure of another component/process that may have caused failure of the first component/process. Contamination and residue are common causes of component/process failure in a hard disk drive.

To that extent, identification, and the potential source, of the contaminant and/or the residue may include chemical and/or molecular analysis.

SUMMARY OF THE INVENTION

A data collection for utilization in failure analysis. The data collection includes a material data set including information associated with materials used in a component subject to a failure analysis process. The data collection also includes a source data set including information associated with the sources of the materials. The data collection further includes an image data set including graphical representations of the materials. The data collection is for providing identification of the composition of the contaminant and source of the contaminant.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide spectrographic image analysis and source determination of a contaminant or residue that may have caused a failure.

Although embodiments of the present invention will be described in conjunction with fabrication processes of, and components in, an HDD assembly, it is understood that the embodiments described herein are useful outside of the art of hard disk drives. The analysis of HDD failures is one example of embodiments of the present invention and is provided herein merely for purposes of brevity and clarity.

Overview

Figure 1:
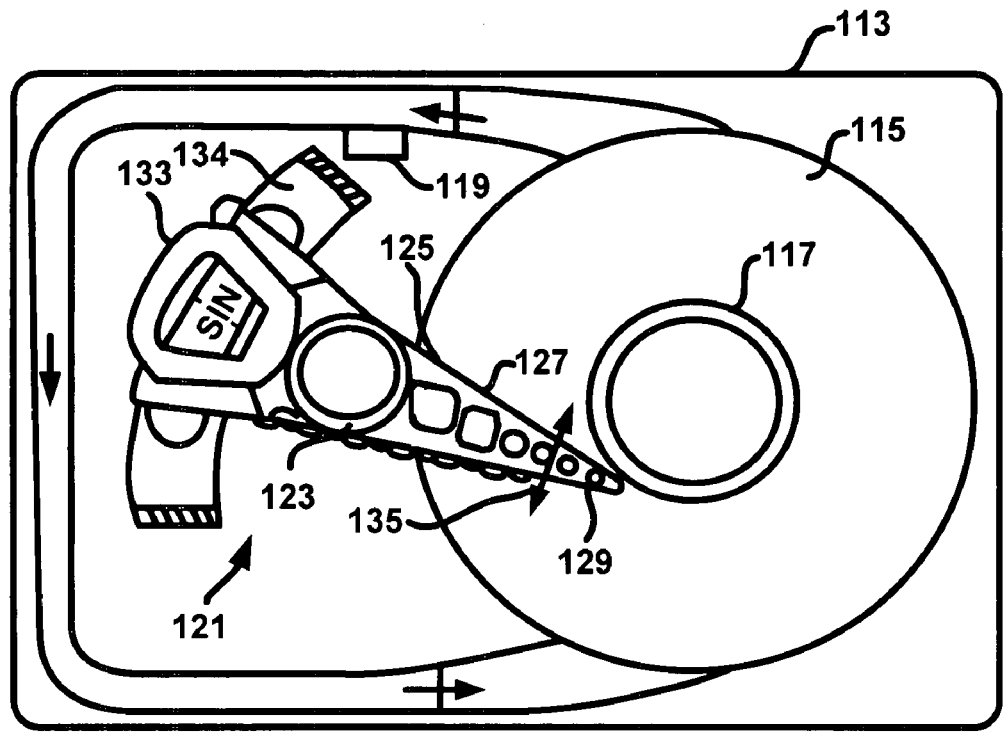
FIG. 1 is plan view of a hard disk drive (HDD) upon which embodiments of the present invention may be practiced.

With reference now to FIG. 1, a schematic drawing of an embodiment of an information storage system comprising a magnetic hard disk file or drive 111 for a computer system is shown. Drive 199 has an outer housing or base 113 containing a disk pack having at least one media or magnetic disk 115. Although not shown in FIG. 1, it is noted that there is an appropriately configured (mated) cover for disposition upon outer housing 113, such that when the cover is in place, a sealed HDD exists. A spindle motor assembly having a central drive hub 117 rotates the disk or disks 115. An actuator 121 comprises a plurality of parallel actuator arms (one shown) in the form of an actuator comb assembly 125 that is movably or pivotally mounted to base 113 about a pivot assembly 123. A controller 119 is also mounted to base 113 for selectively moving actuator comb assembly 125 relative to disk 115.

In the embodiment shown, each parallel arm of actuator comb assembly 125 has extending from it at least one cantilevered electrical lead suspension (ELS) 127. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension (also referred to as a flexure) 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 199 uses multiple independent actuators (not shown) wherein the arms can move independently of one another.

It is with reference to performing analysis of failures during operation and/or fabrication of a device, e.g., HDD 111, that embodiments of the present invention are directed.

Figure 2A:
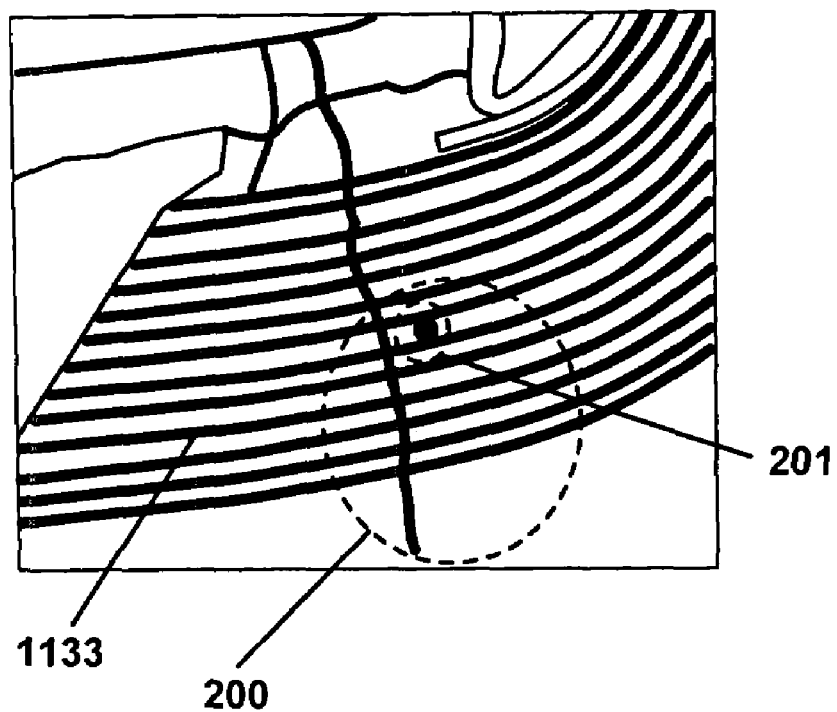
FIG. 2A is an illustration of a contaminant that may have caused a fabrication failure of a component implemented in an HDD in an embodiment of the present invention, in an embodiment of the present invention.

FIG. 2A is an illustrated view of a contaminant found in a process for fabrication of a coil, e.g., coil 133 of HDD 111 of FIG. 1 in an example for embodiments of the present invention. FIG. 2A indicates a highlighted region 200 in which a smaller region 201 is also indicated.

Highlighted region 200 includes a coil mold structure 1133 from which a coil 133 may be fabricated. In the example shown, a contaminant was found on structure 1133 in which the location of the contaminant is generally indicated by region 201. Region 201 is shown in detail with reference to FIG. 2B.

Figure 2B:
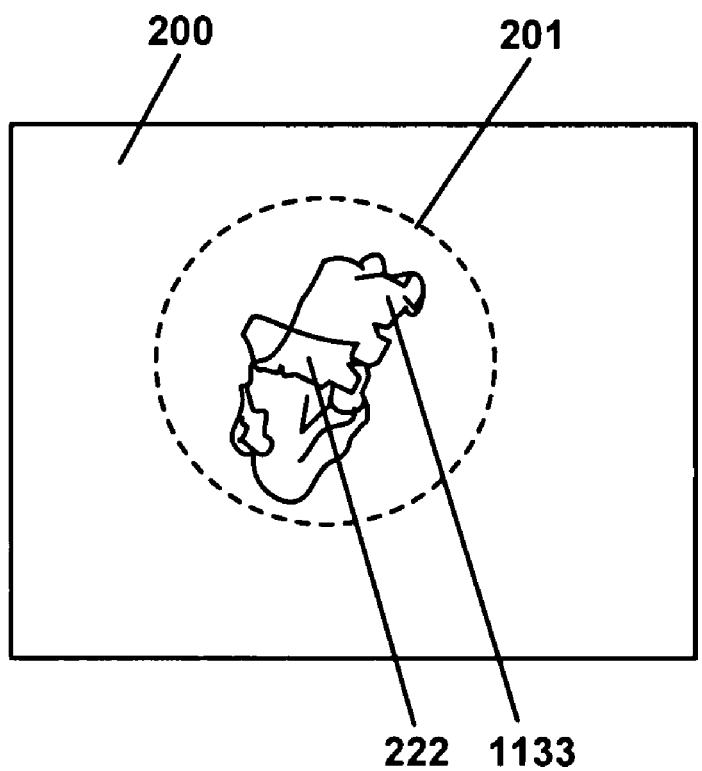
FIG. 2B is an exploded view of the contaminant found shown in FIG. 2A.

FIG. 2B includes a micrographic image of a contaminant found on the coil mold 1133 of FIG. 2A. Coil mold 1133 is shown to have disposed thereon a contaminant, e.g., contaminant 222. In accordance with an embodiment of the present invention, the identity of contaminant 222 may be determined through a process of FTIR spectrographic analysis. A spectrographic imaging system, e.g., system 300 of FIG. 3, may be implemented in conjunction with the analysis.

Figure 3:
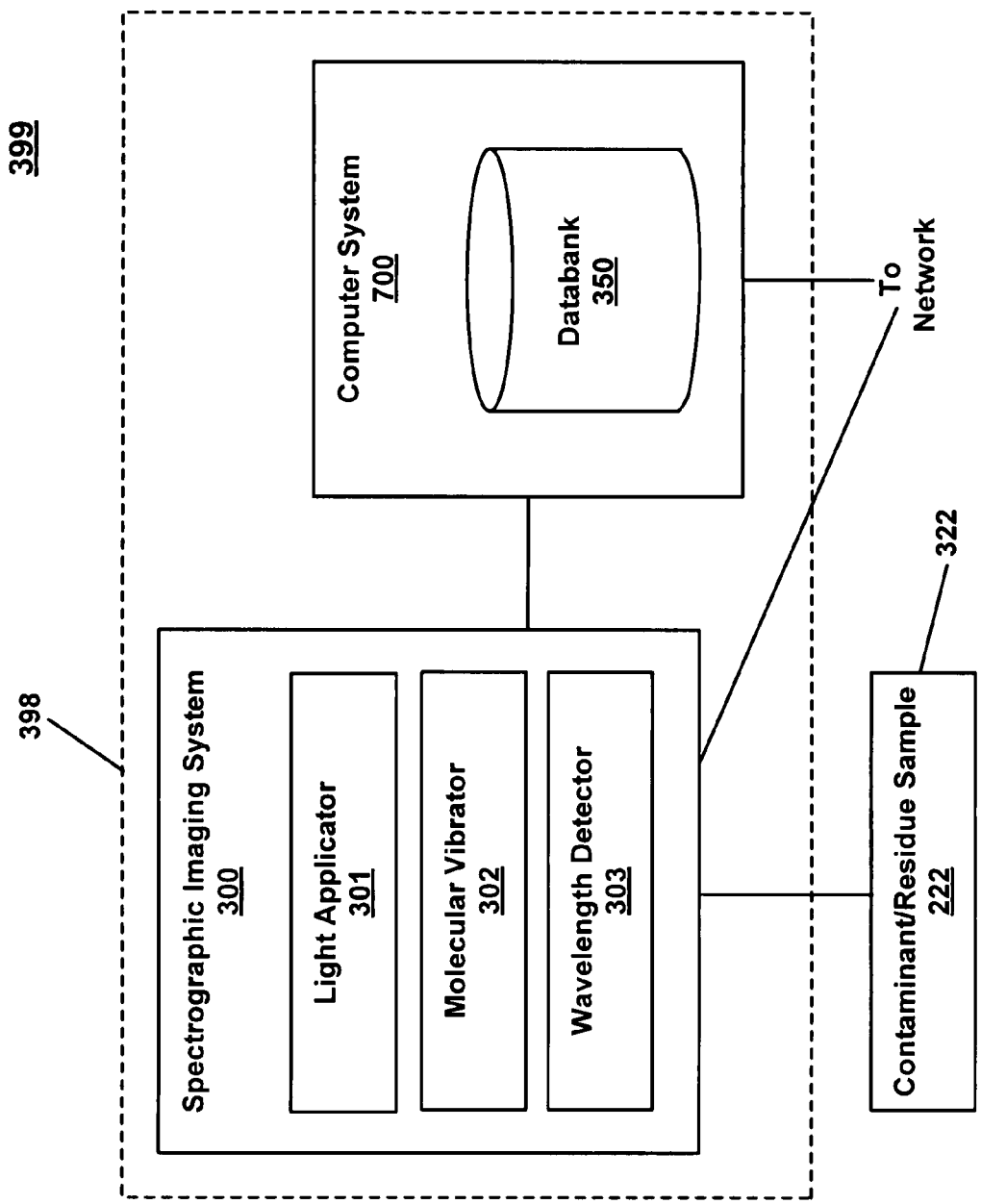
FIG. 3 is a block diagram of an environment for creating and analyzing a spectrographic image of a contaminant sample, in accordance with an embodiment of the present invention.

FIG. 3 is an environment 399 for spectrographic analysis of a sample contaminant/residue found in conjunction with failure of fabrication and/or operation of a hard disk drive, e.g., HDD 111 of FIG. 1, in an embodiment of the present invention.

Figure 4:
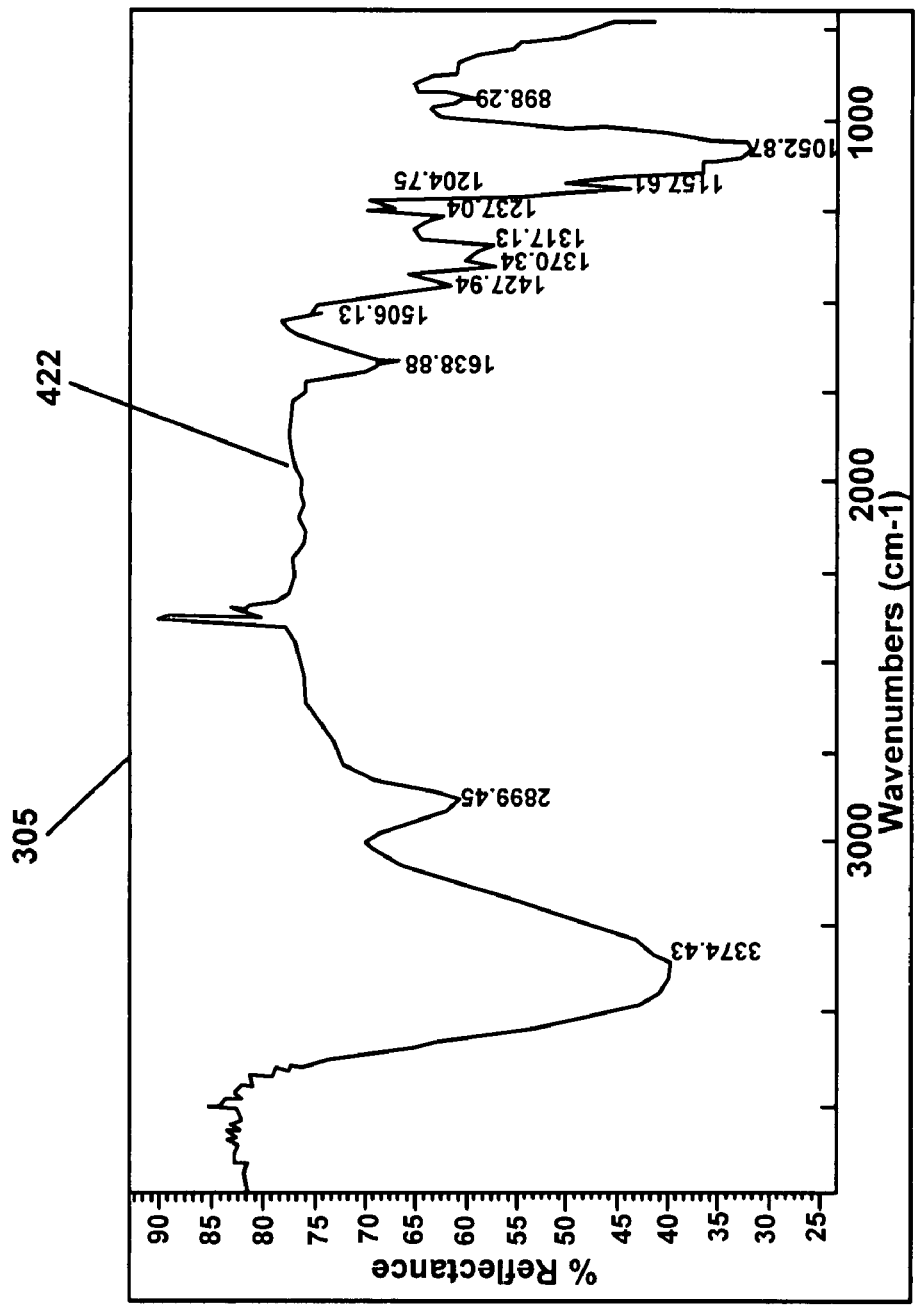
FIG. 4 is a graph showing a created waveform representing a contaminant sample in accordance with an embodiment of the present invention.

Environment 399 includes an imaging system, e.g., spectrographic imaging system 300, for generating an image representing a waveform of the sample contaminant, e.g., wavelength 422 of FIG. 4. Communicatively coupled to imaging system 300 is a contaminant/residue sample platform, e.g., sample platform 322. Sample platform 322 is configured for orienting sample contaminant 222 into one or more imaging/analyzing positions within imaging system 300.

Figure 7:
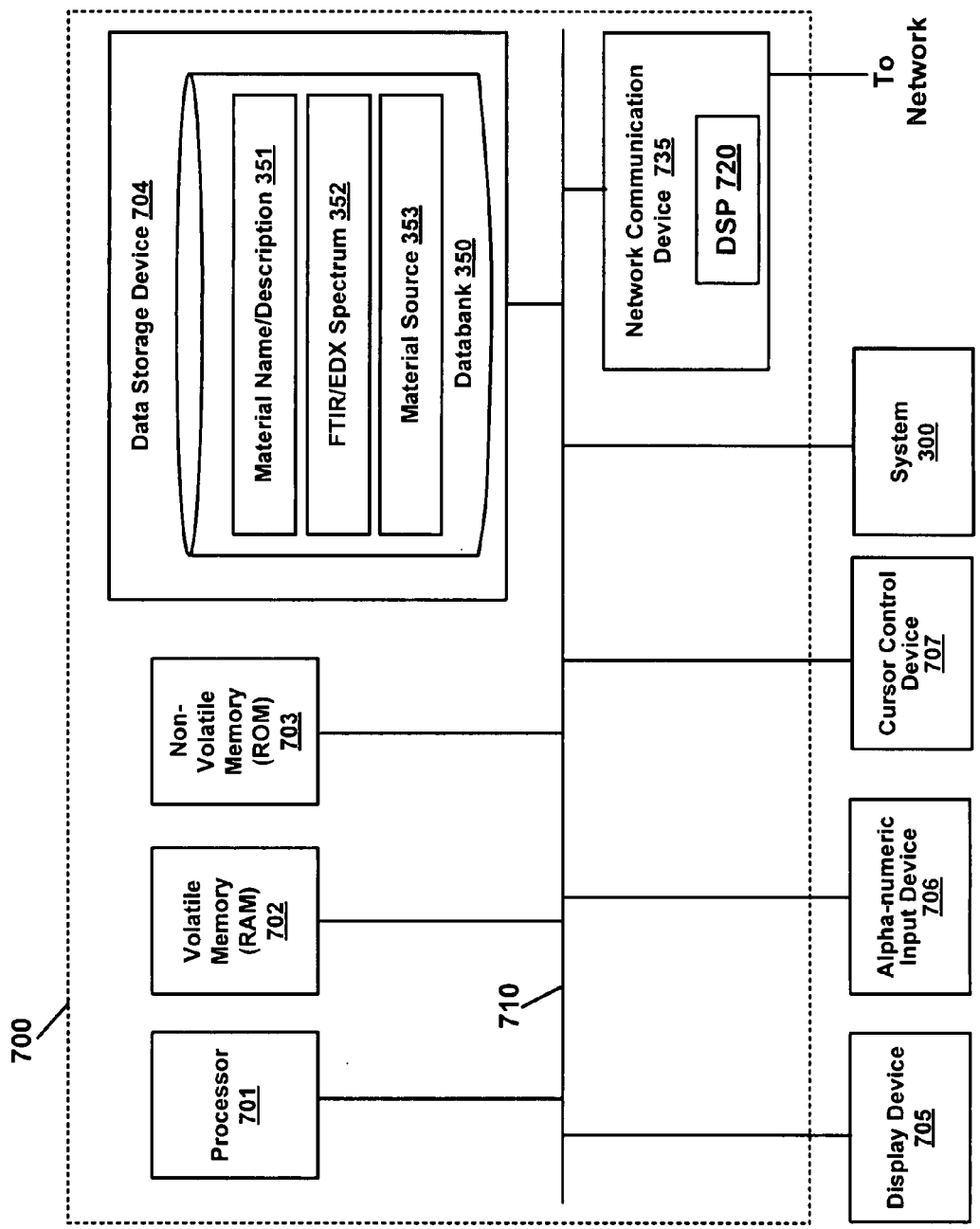
FIG. 7 is a block diagram of a computer system for implementing and controlling processes associated with embodiments of the present invention.

Environment 399 further includes a computer system, e.g., computer system 700, coupled to system 300. Computer system 700, described in detail with reference to FIG. 7, is for displaying and analyzing the generated wavelength. Computer system 700 is shown to include a databank 350. Databank 350, described in detail also with reference to FIG. 7, contains instructions and data for processes associated with the generation and analysis of a sample contaminant waveform.

In an embodiment of the present invention, computer system 700 and imaging system 300 are communicatively coupled but separate components within environment 399. In an alternative embodiment, computer system 700 and imaging system 300 are contained within the same enclosure, shown as dotted line 398. Each component, e.g., imaging system 300, sample platform 322, and computer system 700 is/are communicatively intercoupled via a communication link, as described with reference to FIG. 7.

In an embodiment of the present invention, environment 399 implements a Fourier Transform Infra Red (FTIR) spectroscopy technique that provides data regarding the chemical bonding or molecular structure of the sample contaminant, e.g., contaminant/residue sample 222. This data can include, but is not limited to, determining if contaminant 222 is organic or inorganic. Alternative embodiments of the present invention may implement other techniques, e.g., an EDX process (Energy Dispersal X-ray), a SEM-EDX process, or other process to generate a waveform for determining composition and possible sources of the contaminant.

Still referring to FIG. 3, imaging system 300 includes a molecular vibrator 302 for vibrating molecules of a contaminant sample, e.g., contaminant/residue 222. Imaging system 300 also includes a light applicator 301 for generating an infra red light upon the vibrating molecules. Imaging system 300 further includes a wavelength detector 303 for absorbing an IR wavelength.

The chemical bond or molecular structure of the sample contaminant, e.g., contaminant sample 222, forms the spectrum, generated upon application of IR (Infrared) light on the vibrating molecule. The wave length of the applied IR light causes an analogous IR wavelength to be absorbed. The absorbed IR wavelength is absorbed by a detector, wavelength detector 303 of FIG. 3, which then passes the detected wavelength to the processor, e.g., processor 701 of computer system 700. The absorbed wavelength is calculated by a computer system, e.g., computer system 700 of FIGS. 3 and 7, through implementation of a process termed Fourier Transformation.

Subsequent to a Fourier Transformation process performed on the absorbed wavelength of sample contaminant 222, computer system 700 generates a displayable wavelength, e.g., wavelength 422 of FIG. 4. In an alternative embodiment, an EDX or an SEM-EDX process may be implemented instead of a Fourier Transformation.

FIG. 4 is a display of a wavelength generated in conjunction with imaging and analyzing processes associated with embodiments of the present invention. A display device, e.g., display device 705 of FIG. 7, is shown to have displayed thereon a waveform 422 of displayed image 305 representing the wavelength of a contaminant sample. In the present embodiment, wavelength 422 is representing the waveform of contaminant sample 222 of FIGS. 2B and 3, subsequent to a FTIR spectroscopy process performed in environment 399 of FIG. 3.

Figure 5:
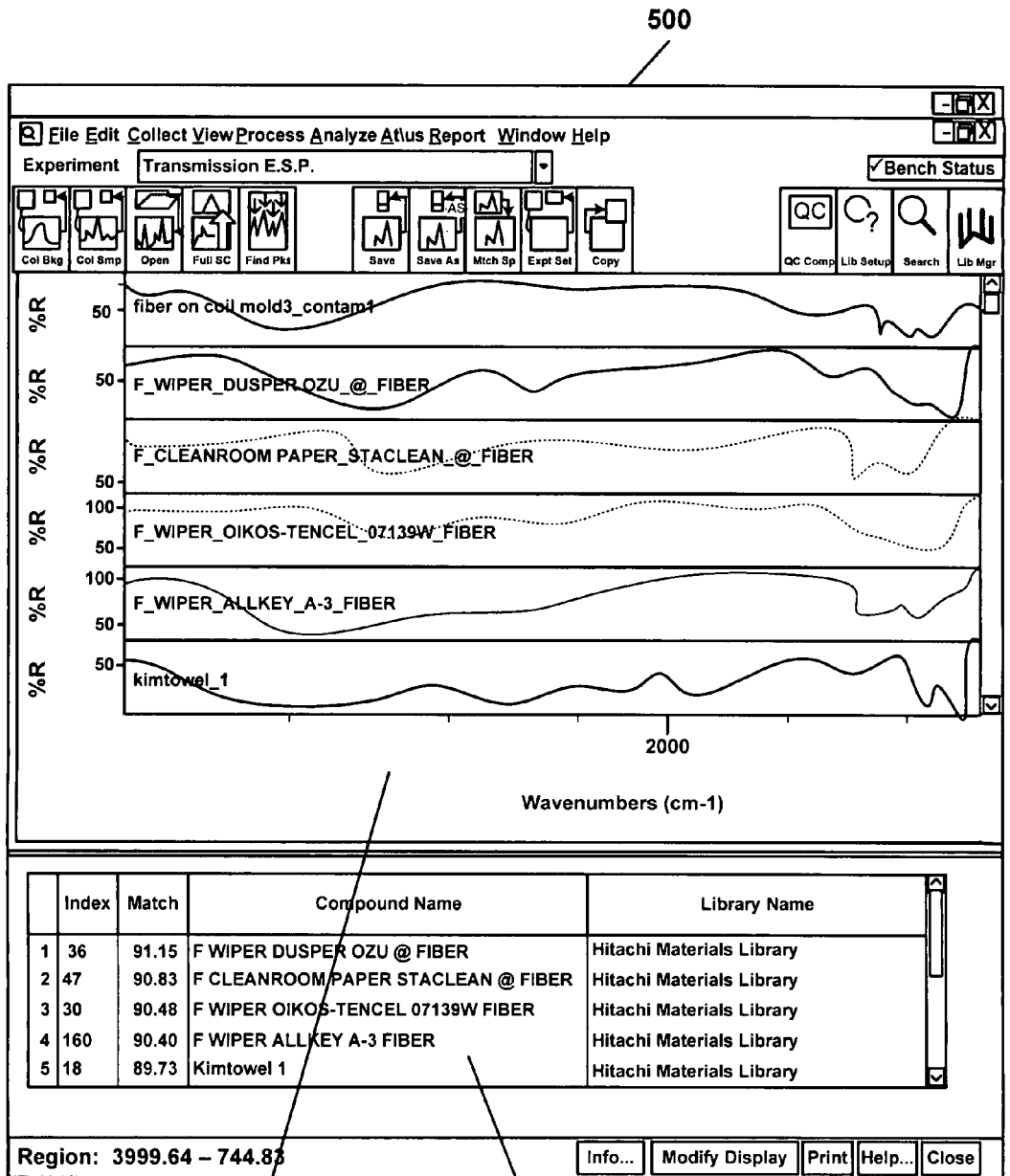
FIG. 5 is a display of possible sources of the contaminant as shown in FIG. 2B, and as represented in the waveform shown in FIG. 4, in accordance with an embodiment of the present invention.

FIG. 5 is a display 500 of possible sources for the sample contaminant, in accordance with embodiments of the present invention. Display 500 includes a waveform 522 section for displaying possible matching waveforms. Display 500 also includes a source section 523 for displaying a list of possible sources of the contamination. In an embodiment, wavelength 422 is then compared with waveforms present in databank 350 and as shown in waveform section 522. In the embodiment of the present invention, waveform 422 is determined to be representative of rayon, a synthetic fiber. In accordance with an embodiment of the present invention, computer system 700 is further configured to further analyze the waveform to determine the specific composition and source of the sample contaminant. Alternatively, a user may select specific waveforms and related possible sources and initiate the determination process.

Figure 6:
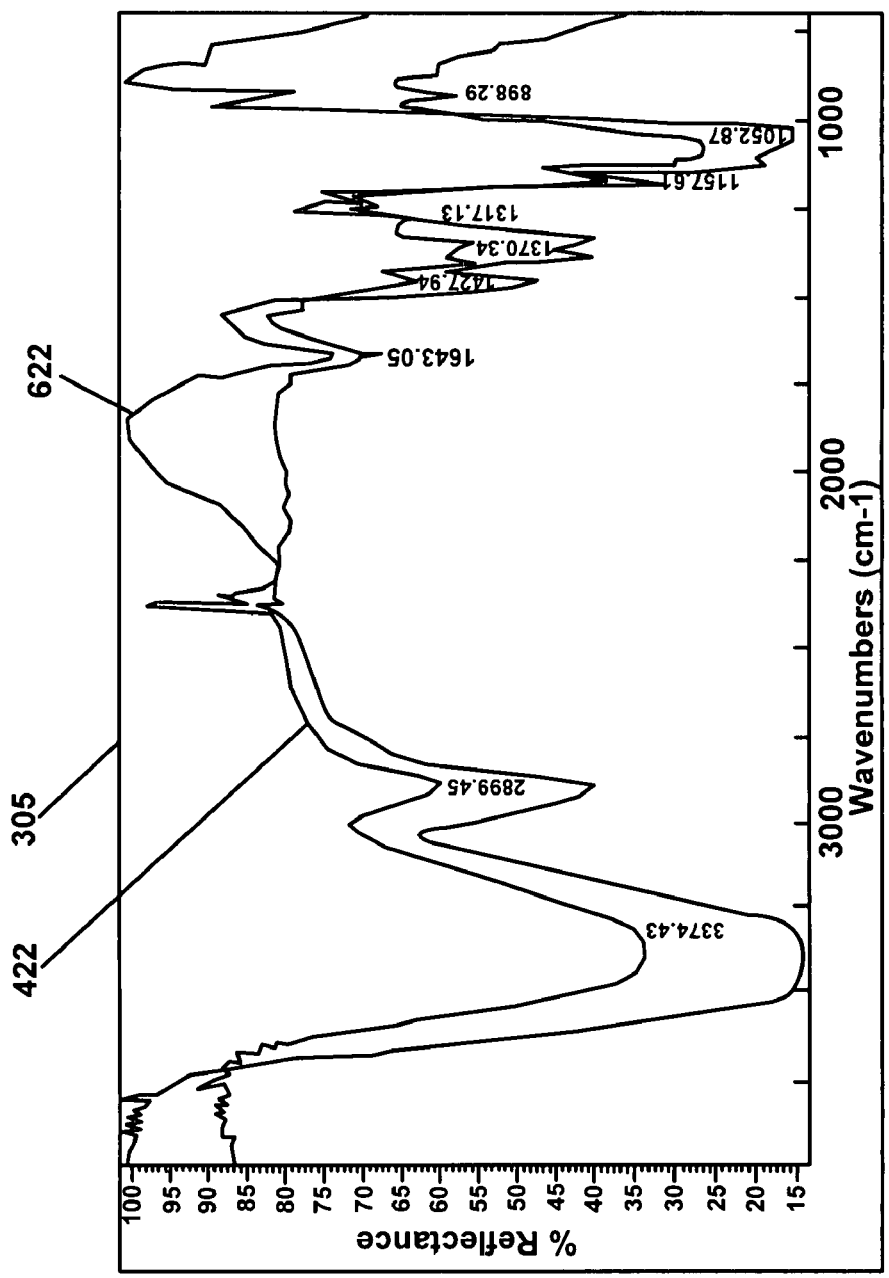
FIG. 6 is an illustration of the waveform of FIG. 4 overplayed upon a matching waveform indicating a material matching the composition of the contaminant sample in an embodiment of the present invention.

FIG. 6 is a waveform display illustrating the sample contaminant waveform 422 overlaid on a stored waveform, e.g., waveform 622, of databank 350 of computer system 700, in an embodiment of the present invention. Waveform 622 represents a matching waveform indicating a match in contaminant material. Further, because there is a waveform match, embodiments of the present invention can further enable contaminant source determination.

Further, by virtue of databank 350 having stored therein a waveform representing the components, tools, jigs, materials, sub materials, consumables, chemicals, etc., that may be present in a hard disk drive fabrication process, embodiments of the present invention are enabled to determine that the source of the rayon contaminant source may be a coil fabrication associated wiper particle. In the present embodiment, environment 399 determines that the rayon contaminant source is from a coil fabrication process and that the source of the material is a wiper. Further, embodiments of the present invention are further configured to specifically identify the source, in this instance a specific wiper used in the production of coil 133.

Conversely, commercially available spectrum libraries may be able to identify the material of a sample, e.g., rayon, but the identification is non-specific and not of substantial use. In the present example, a commercial spectrum library may identify the material in the sample as rayon. Because of the nearly endless list of devices, tools, jigs, component, and processes associated with the sample, e.g., from a coil fabrication process, classification of the contaminant sample as rayon is not source determinate.

FIG. 7 is a block diagram illustrating an exemplary computer system 700 that can be implemented in accordance with embodiments of the present invention. It is noted that computer system 700 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 700 and which are executed by a processor(s) of computer system 700, in one embodiment. When executed, the instructions cause computer system 700 to perform specific actions and exhibit specific behavior which is described in detail herein.

Computer system 700 of FIG. 7 comprises an address/data bus 710 for communicating information, one or more central processors 701 coupled to bus 710 for processing information and instructions. Central processor(s) 701 can be a microprocessor or any alternative type of processor. Computer system 700 also includes a computer usable volatile memory 702, e.g., random access memory (RAM), static RAM (SRAM), dynamic RAM (DRAM), synchronous dynamic RAM (SDRAM), double data rate RAM (DDR RAM), etc., coupled to bus 710 for storing information and instructions for processor(s) 701. Computer system 700 further includes a computer usable non-volatile memory 703, e.g., read only memory (ROM), programmable ROM, electronically programmable ROM (EPROM), electrically erasable ROM (EEPROM), flash memory (a type of EEPROM), etc., coupled to bus 710 for storing static information and instructions for processor(s) 701. In an embodiment, non-volatile memory 703 can be removable.

System 700 also includes one or more signal generating and receiving devices, e.g., signal input/output device(s) 735 coupled to bus 710 for enabling computer 700 to interface with other electronic devices via a network. Communication interface 735 can include wired and/or wireless communication functionality. For example, in one embodiment, communication interface 735 is an Ethernet adapter, but can alternatively be one of a number of well known communication standards and protocols, e.g., a parallel port, a serial communication port, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 735. In such an instance, communication interface 735 may include a DSL modem. A network may be, but is not limited to, a client/server network, an intranet network, an internet network, or any other network enabling intercommunication between two or more computer systems.

Still referring to FIG. 7, network communication device 735, in an embodiment, includes an optional digital signal processor (DSP) 720 for processing data to be transmitted or data that are received via network communication device 735. Alternatively, processor 701 can perform some or all of the functions performed by DSP 720.

Computer 700 of FIG. 7 can also include one or more computer usable data storage device(s) 704 coupled to bus 110 for storing instructions and information, in one embodiment of the present invention. In one embodiment, data storage device 704 can be a magnetic storage device, e.g., a hard disk drive, a floppy disk drive, a zip drive, or other magnetic storage device. In another embodiment, data storage device 704 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 704 can be located internal and/or external of system 700 and communicatively coupled with system 700 utilizing wired and/or wireless communication technology, thereby providing expanded storage and functionality to system 700.

In an embodiment of the present invention, data storage device 704 is shown to include a databank 350. Databank 350, in addition to including instructions for causing processes to be performed in accordance with embodiments of the present invention, databank 350 also includes a material name section 351 for storing the names of the various materials and a description of the material, e.g., composition, chemical bonding, molecular structure, etc. Databank 350 also includes a waveform section 352 for storing waveforms representing the composition of materials stored in section 351. Databank 350 additionally includes a source section 350 for storing the sources of the material, e.g., jigs, tools, materials, sub materials, consumables, chemicals, etc. Information stored in databank 350 may be provided by suppliers of those materials.

In an embodiment of the present invention, databank 350 may contain material and source information for an entire device, e.g., a hard disk drive 111. In another embodiment of the present invention, databank 350 may comprise material and source information for a particular portion of a device, e.g., HDD coil fabrication. In yet another embodiment of the present invention, databank 350 may comprise material and source information for a plurality of devices and/or a plurality of portions. Although databank 350 is shown wholly disposed in storage device 704 in the present embodiment, databank 350 may alternatively be stored in volatile memory 702, non-volatile memory 703, or in a combination of memory 702, memory 702 and storage device 704.

System 700 can also include one or more optional display devices 705 coupled to bus 710 for displaying video, graphics, and/or alphanumeric characters. It is noted that display device 705 can be a CRT (cathode ray tube), a thin CRT (TCRT), a liquid crystal display (LCD), a plasma display, a field emission display (FED), a television or any other display device or combinations of display devices suitable for displaying video, graphics, and alphanumeric characters recognizable to a user. In an embodiment of the present invention, display device 705 may be a touch screen display device.

Computer system 700 of FIG. 7 further includes an optional alphanumeric input device 706 coupled to bus 710 for communicating information and command selections to processor(s) 701, in one embodiment. Alphanumeric input device 706 is coupled to bus 710 and includes alphanumeric and function keys. Also included in computer 100 is an optional cursor control device 707 coupled to bus 710 for communicating user input information and command selections to processor(s) 701. Cursor control device 707 can be implemented using a number of well known devices such as a mouse, a trackball, a track pad, a joy stick, a optical tracking device, a touch screen, etc. It is noted that a cursor can be directed and/or activated via input from alphanumeric input device 706 using special keys and key sequence commands. It is further noted that directing and/or activating the cursor can be accomplished by alternative means, e.g., voice activated commands, provided computer system 700 is configured with such functionality.

Figure 8:
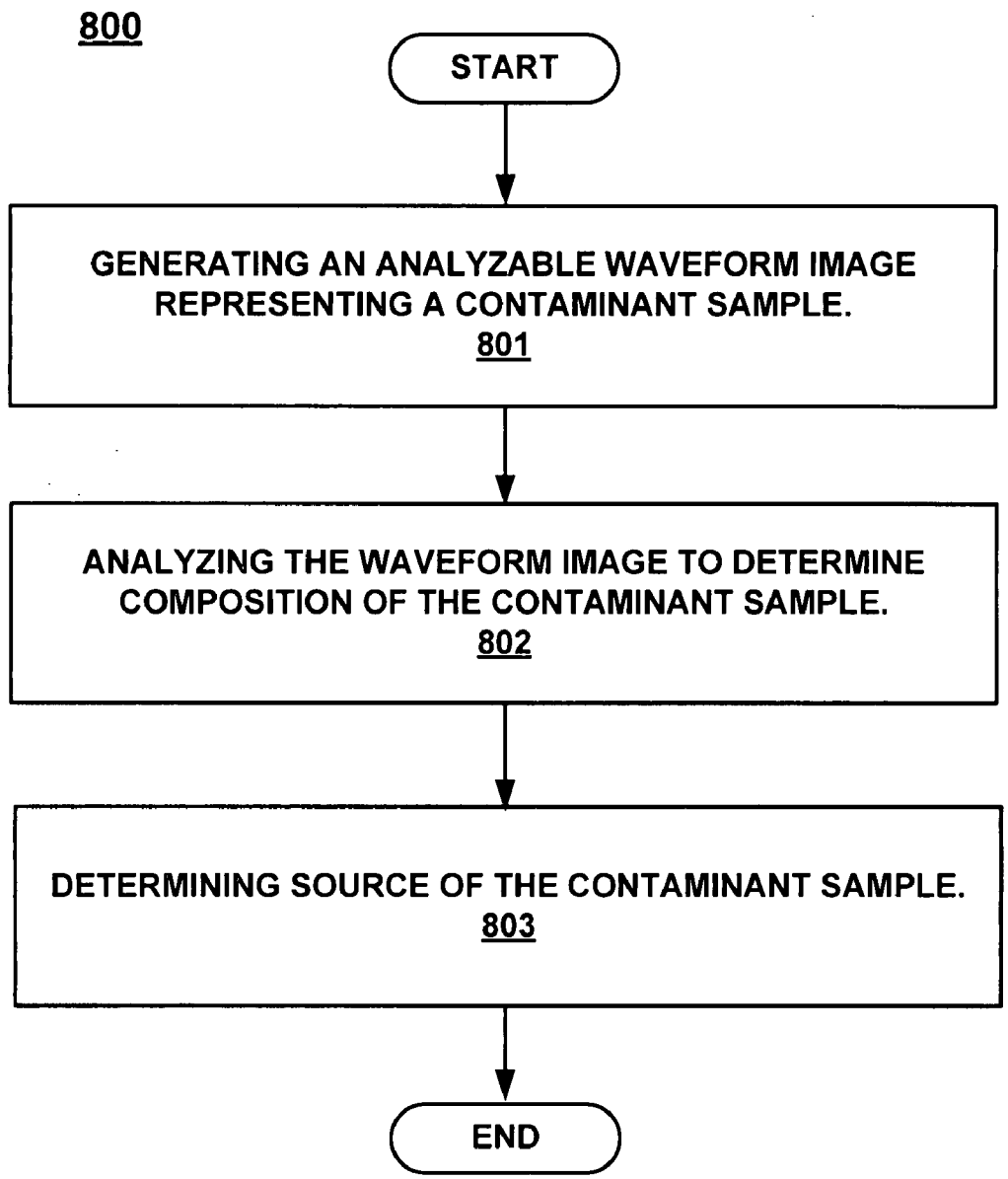
FIG. 8 is a flowchart of a method for determining source and composition of a contaminant sample in accordance with an embodiment of present invention.

FIG. 8 is a flowchart of a process 800 for determination of a contaminant source during failure analysis performed in accordance with an embodiment of the present invention. FIG. 8 is a flow chart of a process 800 in which particular steps are performed in accordance with an embodiment of the present invention for component to component mounting. Although specific steps are disclosed in process 800, such steps are exemplary. That is, the present invention is well suited to performing various other steps or variations of the steps recited in FIG. 8. Within the present embodiment, it should be appreciated that the steps of process 800 may be performed by software, by hardware, by an assembly mechanism, through human interaction, or by any combination of software, hardware, assembly mechanism, and human interaction.

Process 800 for determining a contaminant source will be described with reference to components and devices shown in FIGS. 2A-2B and 3-7 in accordance with embodiments of the present invention.

In step 801 of process 800, a sample of a contaminant, e.g., contaminant 222, found during a failure analysis process is placed within an imaging system, e.g., imaging system 300 of FIG. 3. The sample is subjected to an applied light, e.g., an IR light applied by a light application, e.g., light applicator 302 of FIG. 3. The IR light is applied during vibration of the sample of the contaminant, as provided by an agitator, e.g., molecular vibrator 302 of FIG. 3. The chemical bond or the molecular structure of the contaminant sample form the spectrum, which is generated when the IR light is applied on the vibrating molecule and/or chemical, causing an analogous waveform to be absorbed by imaging system 300 of FIG. 3. Imaging system 300 calculates the absorbed wavelength through a Fourier Transformation (FTIR). A wavelength, e.g., wavelength 422 of FIG. 4, represents the composition of the contaminant sample.

In step 802 of process 800, the generated wavelength, wavelength 422, is analyzed in an embodiment of the present invention. Computer system 700 accesses a data base of stored waveforms, e.g., databank 350, and compares wavelength 422 with waveforms stored therein, e.g., waveforms contained in FTIR/EDX spectrum section 352 of databank 350, as shown in FIG. 5.

In step 803 of process 800, computer system 700 determines one or more matching waveforms or waveforms approximating wavelength image 422 from those waveforms stored in databank 350, e.g., waveform 622 of FIG. 6. Computer system 700 accesses the information related to the waveform, e.g., material name and description as shown in material name/description section 351 of databank 350 and material source section 352, e.g., tools, jigs, consumables, etc., to determine the source of the contaminant. Transforming and analyzing a generated wavelength representing a sample contaminant enable embodiments of the present invention to provide source determination of a contaminant.

Embodiments of the present invention, in the various presented embodiments, provide a system and method for determining contaminant composition and source in a failure analysis process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented data collection for utilization in a physical contaminant failure analysis, said computer-implemented data collection comprising:
   a material data set comprising information, stored in a data storage device of a computer system, associated with materials used in a component subject to a physical contaminant failure analysis process;
   a source data set comprising information, stored in said data storage device of said computer system, associated with sources of said materials; and
   an image data set, stored in said data storage device of said computer system, said image data set comprising graphical representations of said materials, said computer-implemented data collection for providing identification of said physical contaminant and a source of said physical contaminant.

2. The data collection as recited in claim 1 wherein said material data set further comprises an identifier for each material in said materials.

3. The data collection as recited in claim 1 wherein said material data set further comprises a description for each material in said materials.

4. The data collection as recited in claim 1 wherein said source data set further comprises process categorization and process information related to each material in said materials.

5. The data collection as recited in claim 1 wherein said graphical representations further comprise:
   a transformed waveshape representing composition of each material in said materials.

6. The data collection as recited in claim 5 wherein said transformed waveshape comprises a Fourier Transformation performed on absorbed light applied on each material in said materials.

7. The data collection as recited in claim 5 wherein said transformed waveshape comprises an energy dispersive x-ray performed on absorbed light applied on each material in said materials.

8. A system for identification of a source of a physical contaminant, said system comprising:

means for transforming a generated image into a waveshape representative of composition of said physical contaminant;
   means for accessing a material data set, said material data set comprising information associated with materials used in said component subject to a failure analysis process;
   means for accessing a source data set, said source data set comprising information associated with sources of said materials;
   means for comparing said waveshape with said information of said stored data collection;
   means for identifying a source of said physical contaminant from said information of said data collection; and
   means for storing said material data set and said source data set in a data storage device.

9. The system as recited in claim 8 wherein said means for accessing a stored data collection further comprises;
   means for accessing an image data set, said image data set comprising waveshape representations of said materials.

10. The system as recited in claim 8 further comprising:
    means for generating a transformed waveshape image representing each material associated with said component.

11. The system as recited in claim 10 wherein said means for generating a transformed waveshape further comprises:
    means for performing a Fourier Transformation to achieve said transformed waveshape.

12. The system as recited in claim 10 wherein said means for generating a transformed waveshape further comprises:
    means for performing an energy dispersive x-ray to achieve said transformed waveshape.

13. A computer-implemented method for physical contaminant source determination, said computer-implemented method comprising:
    generating, using a computer system, a waveshape image representing a physical contaminant associated with a component in a failure analysis process;
    comparing, using a computer system, said waveshape image with a computer-implemented data collection, said computer-implemented data collection comprising:
    a material data set comprising information, stored in a data storage device of a computer system, associated with materials used in said component subject to said failure analysis process;
    a source data set comprising information, stored in a data storage device of a computer system, associated with sources of said materials;
    an image data set comprising transformed waveshape representations, stored in a data storage device of a computer system, of said materials associated with implementation of said component;
    determining, using a computer system, a composition of said physical contaminant; and
    determining, using a computer system, a source of said physical contaminant.

14. The method as recited in claim 13 further comprising:
    performing a spectroscopic transformation of a generated image to achieve said waveshape image and said transformed waveshape representations.

15. The method as recited in claim 14 wherein said performing a spectroscopic transformation further comprises:
    performing a Fourier Transformation to achieve said analyzable waveshape image and said transformed waveshape representation.

16. The method as recited in claim 14 wherein said performing a spectroscopic transformation further comprises:

performing an energy dispersive x-ray transformation to achieve said analyzable waveshape image and said transformed waveshape representation.

17. The method as recited in claim 13 further comprising; matching said waveshape image to a transformed waveshape representation of said transformed waveshape representations to identify composition of said physical contaminant.

18. The method as recited in claim 13 further comprising: adding said waveshape image to said transformed waveshape representations upon determination of said waveshape image not matching a transformed waveshape representation of said transformed waveshape representations.

* * * * *